United States Patent [19]

Freeman

[11] Patent Number: 5,221,550

[45] Date of Patent: Jun. 22, 1993

[54] PREPARATION OF SAUCE

[75] Inventor: Nigel B. Freeman, Feltham, Great Britain

[73] Assignee: Nestec S.A., Vevey, Switzerland

[21] Appl. No.: 660,255

[22] Filed: Feb. 26, 1991

Related U.S. Application Data

[63] Continuation of Ser. No. 394,571, Aug. 16, 1989, abandoned.

[30] Foreign Application Priority Data

Aug. 17, 1988 [GB]  United Kingdom ............... 8819518

[51] Int. Cl.$^5$ .................................................. A23L 1/00
[52] U.S. Cl. ..................................... 426/589; 159/6.2; 426/492
[58] Field of Search ............... 426/400, 471, 492, 493, 426/587, 589; 159/6.2

[56] References Cited

U.S. PATENT DOCUMENTS

| | | | |
|---|---|---|---|
| 1,443,714 | 8/1918 | Merrell ................. | 159/6.2 |
| 1,459,182 | 6/1923 | Mabee ................... | 159/6.2 |
| 3,054,444 | 9/1962 | Robbins ................. | 159/6.2 |
| 3,130,108 | 4/1964 | Eckstrom et al. ........ | 159/6.2 |
| 3,873,753 | 3/1975 | Nelson et al. ........... | 426/384 |
| 3,962,028 | 6/1976 | Walsh .................. | 159/13.4 |
| 4,560,564 | 12/1985 | Bruno, Jr. et al. ....... | 426/104 |
| 4,615,899 | 10/1986 | Hunter et al. ........... | 426/104 |
| 4,818,555 | 4/1989 | Piotrowski et al. ....... | 426/492 |
| 4,886,574 | 12/1989 | Grant .................. | 426/599 |

OTHER PUBLICATIONS

Food Chemistry, second edition, Edited by O. R. Fennema, Marcel Dekker, Inc. 1985 p. 615.
The American Heritage Dictionary, Second College Edition, p. 1092, 1982.
Food Science, third edition, Norman N. Potter Avi Publishing Co., Inc. 1978, pp. 306–312.

Primary Examiner—George Yeung
Attorney, Agent, or Firm—Vogt & O'Donnell

[57] ABSTRACT

Reduction sauces are prepared by first preheating ingredients of a reduction sauce and then feeding the preheated ingredients to and through a scraped surface heat exchanger operating at substantially atmospheric pressure and having a scraper speed of below 200 RPM which heats the ingredients to a temperature for evaporating at least some of the ingredients for concentrating the ingredients and developing a reduction sauce flavor during the residence time of the ingredients in the heat exchanger. The evaporated vapors are separated and removed from the concentrated heated reduction sauce.

16 Claims, 2 Drawing Sheets

PREPARATION OF SAUCE

This application is a continuation of application Ser. No. 07/394,571, filed Aug. 16, 1989, now abandoned.

BACKGROUND OF THE INVENTION

The present invention relates to a process for the production of reduction sauces.

Reduction sauces are those sauces which have all or some of their ingredients reduced by evaporation. Typically in the kitchen, a chef produces a sauce in a saucepan or shallow pan by boiling vigorously some or part of the ingredients of a recipe. Liquid ingredients such as stock, wine, alcohol or vinegar will be concentrated as the liquid phase is evaporated. The pan or saucepan is normally heated over a high flame or high temperature heat source, usually causing a degree of caramelisation and the development of the definite and typical flavour of that reduced recipe.

Reduction sauces are at present manufactured batchwise by boiling in an open steam jacketed pan and this has been up to now the only satisfactory method for producing their characteristic flavour. However, since the evaporation rate is only about 3 liters/min, this method is time consuming as well as operator dependent. Attempts have been made to accelerate the removal of the ingredients which are normally reduced by evaporation by methods other than boiling at atmospheric pressure. Such methods have included boiling under vacuum and removal of the water phase from the recipe formulation, but although these methods increase the speed at which the concentrate can be manufactured, they do not produce a product with the characteristic flavour of a reduction sauce.

SUMMARY OF THE INVENTION

The present invention provides a process for producing reduction sauces, which process is significantly faster than the current manufacturing process while at the same time producing a product having the characteristic flavour of a reduction sauce.

Accordingly, the present invention provides a process for the production of a reduction sauce characterised in that the ingredients of a reduction sauce are preheated and then fed to a scraped surface heat exchanger operating at substantially atmospheric pressure and with a scraper speed of below 200 RPM where evaporation takes place and the vapours are separated.

DETAILED DESCRIPTION OF THE INVENTION

In the practice of the present invention the ingredients of the reduction sauce may be preheated, for instance, to a temperature from 60° to 160° C., by any suitable means. For example, a pan or kettle may be used in which the ingredients are conveniently preheated to a temperature from 70° to 95° C., preferably from 75° to 90° C. and especially from 80° to 85° C. The pan or kettle may be heated, for instance, by means of a steam jacket or it may be electrically heated.

Advantageously, a heat exchanger under pressure, preferably a scraped surface heat exchanger operating at superatmospheric pressure, may be used for preheating the ingredients of the reduction sauce whereby a higher feed temperature to the scraped surface heat exchanger operating at atmospheric pressure can be obtained for example from 120° to 160° C., preferably from 130° to 150° C. and especially from 135° to 145° C. The pressure in the heat exchanger may be from 1 to 10 bars, preferably from 2 to 6 bars and especially from 3 to 5 bars. If desired, both a pan or kettle and a heat exchanger under pressure may be used for preheating the ingredients. The temperature in the pan or kettle is preferably the highest temperature possible which does not cause substantial caramelisation or evaporation, e.g., 75° to 85° C.

In the scraped surface heat exchanger operating at substantially atmospheric pressure, the ingredients are conveniently heated at a temperature from 100° to 120° C., preferably from 102° to 110° C. At this stage some or all of the ingredients are boiled to concentrate them, and it should be understood that at this stage the concentration requirements differ for different reduction sauces. For example, some reduction sauces only require 40–50% concentration while others require 80–90% concentration at the reduction stage.

Depending on the degree of concentration required, the flow rate and the residence time in the scraped surface heat exchanger operating at atmospheric pressure may vary. For example, the flow rates may typically range from 0.5 to 10 liters/min, more usually from 1 to 5 liters/min and the residence time may vary, for example, from 10 to 100 seconds, more usually from 20 to 80 seconds, preferably from 30 to 60 seconds. A larger batch of product may be held for longer time periods and at higher temperatures.

Advantageously, the scraper speed of the scraped surface heat exchanger operating at substantially atmospheric pressure is significantly slower than the normal operating speed of about 400 RPM. For example, the speed is desirably below 100 RPM, preferably below 50 RPM, more preferably from 5 to 25 RPM and especially from 10 to 20 RPM. The slow scraper speed usually prevents burning-on of the product and seems to help in the development of the characteristic flavour of the reduction sauce.

During the residence time in the scraped surface heat exchanger operating under substantially atmospheric pressure, evaporation takes place and means are suitably provided for separating the vapours from the concentrated product, for example, a separator chamber located at the upper part of the heat exchanger or a flash vessel. Conveniently, the vapours that are separated are condensed before being drawn off.

The concentrated product may be collected and used as such or, if insufficiently concentrated, it may be recirculated to concentrate it further. A sauce with a low reduction stage is normally heated and cooled more quickly, and does not usually need to be recirculated. Generally, cream and optionally a small amount of starch or water is added to the concentrate which may afterwards be deep-frozen or chilled.

Typical products produced by the process of the present invention are as follows:

White wine sauce with a 50% concentration at the reduction stage,

Dugelere sauce with a 50% concentration at the reduction stage,

White wine and Tarragon sauce with an 85% concentration at the reduction stage, and Oriental sauce with a 90% concentration at the sour caramel stage and a 20% concentration at the reduction stage (n.b. sour caramel is a mixture of sugar and vinegar boiled to remove the water to produce a vinegar based caramel).

By using the process of the present invention, reduction sauces can be produced at about 5 to about 10 times faster than when manufactured batchwise in an open steam-jacketed pan. In addition, the yield may be increased because many of the reduction sauces produced by the process of the present invention are stronger than the kitchen control. For example, only 50% of Vermouth sauce is required to match the strength of the kitchen control, thus giving 100% increase in yield. The process of the present invention is particularly advantageous for sauces requiring a high reduction stage.

BRIEF DESCRIPTION OF THE DRAWINGS

The present invention is described further by way of illustration only, with reference to the accompanying drawings in which FIG. 1 represents one kind of apparatus used comprising two scraped surface heat exchangers and in which

DETAILED DESCRIPTION OF THE DRAWINGS

Figure 1:
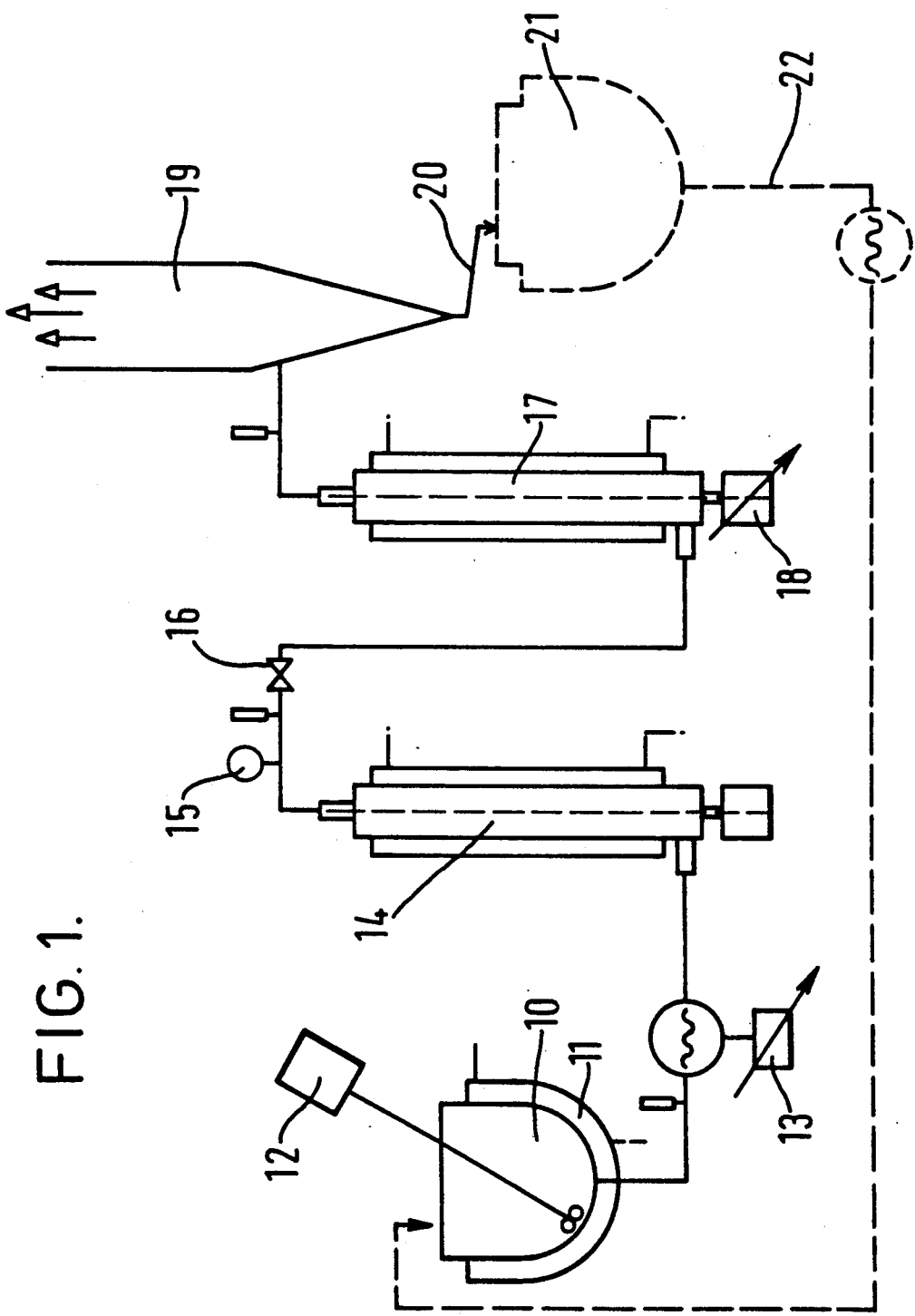

Referring to FIG. 1 of the drawings, the apparatus consists of a 150 liter feed tank 10, having a steam-jacket 11 and a stirrer 12, a variable speed pump 13, a CREPACO scraped surface heat exchanger 14, a pressure gauge 15, a back pressure valve 16, a Crepaco scraped surface heat exchanger 17 having a variable speed drive to the scraper rotor assembly 18, a flash vessel 19, a discharge pipe 20, a collection tank 21 and a recirculation pipe 22. The discharge pipe 20 may be altered to feed the product either to the collection tank 21 or to the recirculation pipe 22 depending on the degree of concentration required.

Figure 2:
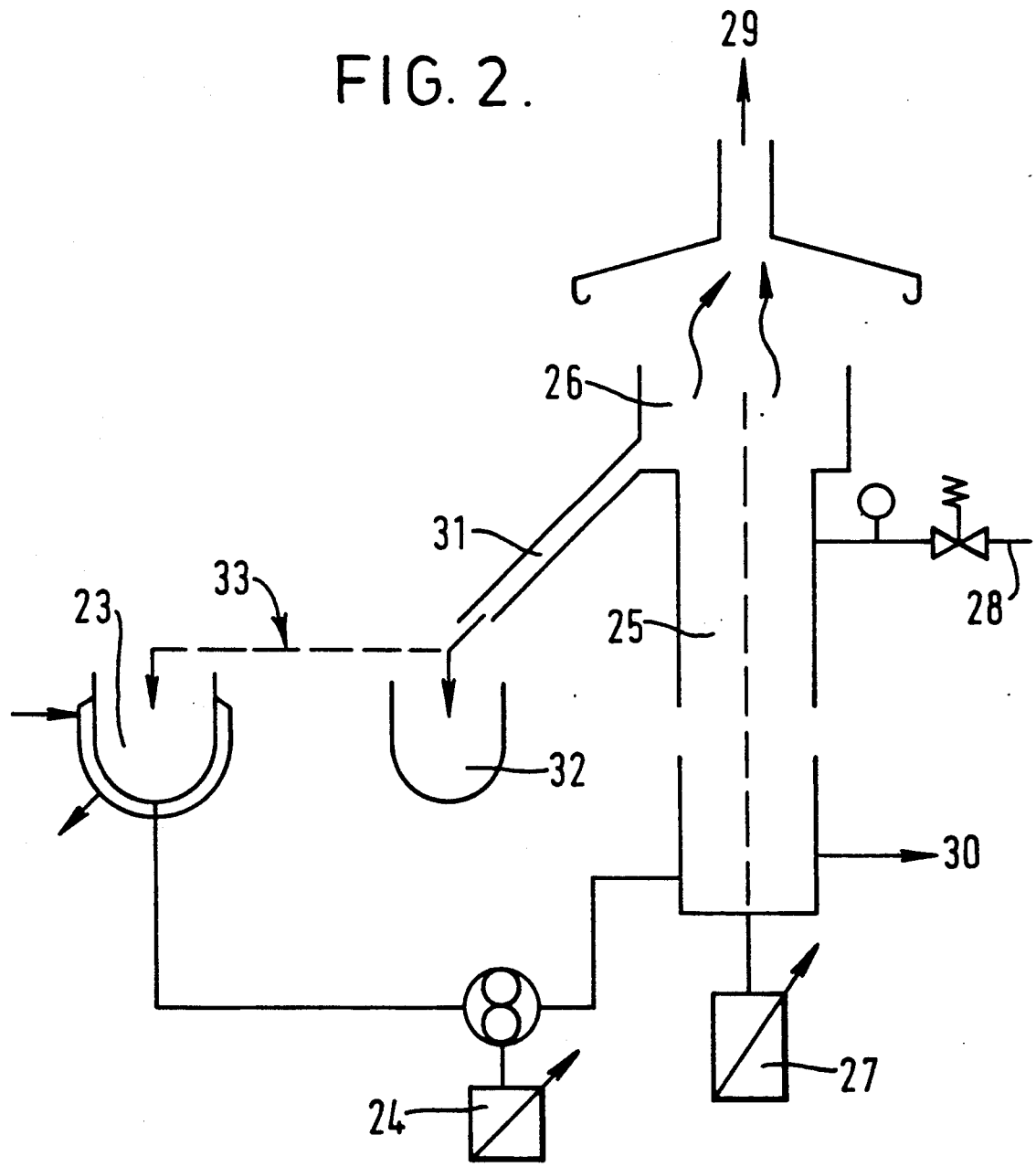
FIG. 2 represents an alternative apparatus comprising only one scraped surface heat exchanger.

Referring to FIG. 2 of the drawings, the apparatus consists of a 150 liter steam jacketed feed tank 23, a variable speed pump 24, a scraped surface heat exchanger 25 operating at atmospheric pressure, fitted at its upper end with a separator chamber 26, a variable speed drive to the scraper rotor assembly 27, a steam inlet 28, a vapour outlet 29, a condenser outlet 30, a discharge pipe 31, a collection tank 32 and a recirculation pipe 33.

EXAMPLES

The following Examples further illustrate the present invention.

EXAMPLE 1

Using the apparatus illustrated in FIG. 1, a hundred liter batch of Vermouth Sauce containing 60 liters vermouth, 14 liters of wine and 50 liters of chicken stock was preheated in the feed tank 10 to 80° C., then pumped to the heat exchanger 14 and heated to 140° C. at a back pressure of 4 bars and the scraper blades rotating at 400 RPM. The sauce then enters the heat exchanger 17 where the temperature is 105° C. at a rate of 222 liters/hr at atmospheric pressure and where the scraper blades rotate at 15 RPM. The product flashes vigorously and then enters the flash vessel 19 where alcohol and water vapour are vented to the atmosphere. The concentrated product was discharged through the discharge pipe 20 and recirculated through the pipe 22 to the feed tank 10 and passed through the heat exchangers until it reached the desired total solids content of 50% when it was discharged through the discharge pipe 20 and collected in the collection tank 21.

The final bulk of the product was made up with a mixture of single and double cream together with a little starch and then deep-frozen. The flavour of the product produced was stronger than that of a kitchen control and only 50% of the product was required to match it giving 100% increase in yield.

EXAMPLE 2

Using the apparatus illustrated in FIG. 2, a hundred liter batch of white wine sauce containing 20% Spanish dry white wine was preheated in the feed tank 23 to 85° C. and then pumped to the scraped surface heat exchanger 25 at a rate of 5.5 liters/min at atmospheric pressure where the scraper blades rotated at 13 RPM. The temperature of the heat exchanger was 105° C. heated by steam in a steam jacket flowing through the steam inlet 28 at a pressure of 5 bars. The product was held in the heat exchanger for 55 seconds where it evaporated to concentrate the wine by 50% so that it formed only 10% of the total ingredients. The vapour was separated from the product in the separator chamber 26 and was discharged through the vapour outlet 29 while the product was discharged through the discharge pipe 31 and collected in the collection tank 32. Any condensed vapour flows down the heat exchanger and is discharged at the condensate outlet 30. The flavour of the product was excellent, and significantly stronger than that of a kitchen control.

I claim:

1. A process for the production of a reduction sauce comprising preheating reduction sauce ingredients, feeding the preheated ingredients to and through a scraped surface heat exchanger having a scraper operating at a speed of below 200 RPM and heating the preheated ingredients during their time of residence in the scraped surface heat exchanger at substantially atmospheric pressure to a temperature for evaporatively concentrating the heated ingredients and for developing a reduction sauce flavor during the residence time of the ingredients in the heat exchanger.

2. A process according to claim 1 wherein the ingredients of the reduction sauce are preheated to a temperature of from 70° C. to 95° C.

3. A process according to claim 1 wherein the ingredients of the reduction sauce are preheated in a heat exchanger under pressure to a temperature of from 120° C. to 160° C.

4. A process according to claim 3 wherein the pressure is up to 10 bars.

5. A process according to claim 3 wherein the preheating heat exchanger is a scraped surface heat exchanger.

6. A process according to claim 3 further comprising, prior to preheating the ingredients to 120° C. to 160° C. under pressure, first preheating the ingredients of the reduction sauce to a temperature from 70° C. to 95° C.

7. A process according to claim 1 wherein the preheated ingredients of the reduction sauce are heated at a temperature of from 100° C. to 120° C. in the scraped surface heat exchanger operating at substantially atmospheric pressure.

8. A process according to claim 1 wherein the scraper operates at a speed of from 10 RPM to 50 RPM.

9. A process according to claim 1 wherein the preheated ingredients of the reduction sauce flow through the scraped surface heat exchanger operating at atmospheric pressure at a flow rate of from 0.5 liters/min to 10 liters/min.

10. A process according to claim 1 wherein the ingredients of the reduction sauce have a residence time in the scraped surface heat exchanger operating at atmospheric pressure of from 10 seconds to 100 seconds.

11. A process according to claim 2 wherein the ingredients of the reduction sauce are preheated in a pan.

12. A process according to claim 2 wherein the ingredients are preheated in a kettle.

13. A process according to claim 6 wherein the ingredients of the reduction sauce are first preheated in a pan.

14. A process according to claim 6 wherein the ingredients of the reduction sauce are first preheated in a kettle.

15. A process according to claim 1 wherein the scraper operates at a speed of below 100 RPM.

16. A process according to claim 1 wherein the scraper operates at a speed of from 5 to 25 RPM.

* * * * *

UNITED STATES PATENT AND TRADEMARK OFFICE
CERTIFICATE OF CORRECTION

PATENT NO. : 5,221,550
DATED     : June 22, 1993
INVENTOR(S) : Nigel B. FREEMAN

It is certified that error appears in the above-identified patent and that said Letters Patent is hereby corrected as shown below:

Column 1, line 25, "3" should be --0.3--.

Column 3, line 30, "Crepaco" should be --CREPACO--.

Signed and Sealed this

Eleventh Day of January, 1994

*Attest:*

BRUCE LEHMAN

*Attesting Officer*   *Commissioner of Patents and Trademarks*